US009821883B2

(12) United States Patent
Blasco Gracia et al.

(10) Patent No.: US 9,821,883 B2
(45) Date of Patent: Nov. 21, 2017

(54) VEHICLE TRACTION DEVICE AND VEHICLE INCORPORATING SAME

(71) Applicant: B Y M Ingenieros S.L., Rafelbunyol (ES)

(72) Inventors: Francisco Jose Blasco Gracia, Rafelbunyol (ES); Ulises Blasco Gracia, Rafelbunyol (ES)

(73) Assignee: B Y M INGENIEROS S.L., Rafelbunyol (ES)

( * ) Notice: Subject to any disclaimer, the term of this patent is extended or adjusted under 35 U.S.C. 154(b) by 31 days.

(21) Appl. No.: 15/022,513

(22) PCT Filed: Sep. 25, 2014

(86) PCT No.: PCT/EP2014/070584
§ 371 (c)(1),
(2) Date: Mar. 16, 2016

(87) PCT Pub. No.: WO2014/184396
PCT Pub. Date: Nov. 20, 2014

(65) Prior Publication Data
US 2016/0221638 A1  Aug. 4, 2016

(30) Foreign Application Priority Data
Sep. 26, 2013  (ES) .................................. 201331406

(51) Int. Cl.
| | |
|---|---|
| *B60K 1/00* | (2006.01) |
| *B62M 17/00* | (2006.01) |
| *B60K 1/04* | (2006.01) |
| *B60K 5/06* | (2006.01) |
| *B60K 11/06* | (2006.01) |

(Continued)

(52) U.S. Cl.
CPC ............... *B62M 17/00* (2013.01); *B60K 1/00* (2013.01); *B60K 1/04* (2013.01); *B60K 5/06* (2013.01); *B60K 11/06* (2013.01); *B60K 17/08* (2013.01); *B62K 11/04* (2013.01); *B62M 7/06* (2013.01); *B60K 1/02* (2013.01); *B60K 5/00* (2013.01); *B60K 2001/006* (2013.01); *B60K 2001/0422* (2013.01); *B60Y 2200/12* (2013.01); *B62K 2204/00* (2013.01); *B62K 2208/00* (2013.01)

(58) Field of Classification Search
CPC ......... B62M 17/00; B62M 7/06; B60K 17/08; B60K 11/06; B60K 5/06
See application file for complete search history.

(56) References Cited

U.S. PATENT DOCUMENTS 5,433,284 A * 7/1995 Chou ...................... B62M 6/90
                                                             180/206.5
5,524,726 A * 6/1996 Wright, Jr. ............. B62K 11/10
                                                             180/220

(Continued)

*Primary Examiner* — Tony H. Winner
*Assistant Examiner* — Gabriela C Craciun
(74) *Attorney, Agent, or Firm* — Wiggin and Dana LLP; Gregory S. Rosenblatt; Jonathan D. Hall

(57) ABSTRACT

Vehicle traction device, mainly for land vehicles, of the type comprising a motor and a transmission wherein the motor preferably has an axial rotation, such as an electric motor, wherein the motor rotation is coplanar and concurrent with the primary shaft of the transmission, and wherein the primary shaft is in turn coaxial to the output shaft, such that the output shaft crosses the primary shaft and extends beyond the ends thereof.

7 Claims, 7 Drawing Sheets

(51) Int. Cl.
B60K 17/08 (2006.01)
B62K 11/04 (2006.01)
B62M 7/06 (2006.01)
B60K 1/02 (2006.01)
B60K 5/00 (2006.01)

(56) References Cited

U.S. PATENT DOCUMENTS

2010/0018787 A1* 1/2010 Plazotta ............... B60L 11/18
 180/65.6
2011/0259660 A1* 10/2011 Johnson ............... B62K 11/04
 180/220

* cited by examiner

VEHICLE TRACTION DEVICE AND VEHICLE INCORPORATING SAME

CROSS REFERENCE TO RELATED APPLICATIONS

This application is a National Stage application of PCT/EP2014/070584, titled "Vehicle Traction Device and Vehicle Incorporating Same" and filed Sep. 24, 2014, which claims the benefit of Spanish Patent Application No. ES 201331406, titled "Vehicle Traction Device and Vehicle Incorporating Same" and filed Sep. 26, 2013. The contents of PCT/EP2014/070584 and ES 201331406 are hereby incorporated herein in their entirety.

As indicated by the title, the subject matter of the present invention relates to a vehicle traction device, for land vehicles mainly, of the type comprising a motor and a transmission, wherein the motor preferably has a coaxial rotation, as in an electric motor, and wherein the rotation shaft of the motor is coplanar and concurrent with the primary shaft of the transmission.

The aforementioned primary shaft is in turn coaxial with the output shaft, such that the output shaft crosses the primary shaft and extends beyond the ends thereof.

The primary shaft is considered to be that which receives the force from the motor because it is connected to the rotation shaft of the same, and the output shaft is considered to be that which, through the transmission, is connected to the drive wheel or wheels.

The present invention is applicable in the field of vehicles.

BACKGROUND OF THE INVENTION

Electric motors are increasingly being used in all types of vehicles, particularly but not exclusively in land vehicles.

One of the main drawbacks of the use of electric motors is the need for batteries which, in general, are large and heavy.

In land vehicles with three or more wheels, this problem is not as important since the weight can be distributed in different ways without greatly affecting the stability, and there is sufficient space to house the batteries. Currently, however, electric motors are infrequently used in two-wheel vehicles as the weight and location of the batteries, as well as the position of the rotation shaft of the electric motor hinder their use.

Another problem faced by two-wheel vehicles is the swinging of the rear wheel suspension, which complicates the transmission and generates tensions and overloads in the transmission chains.

Spanish utility model ES1076136U relates to a swinging gearbox for an electric motorcycle. However, said swinging gearbox requires the rotation shaft of the electric motor to be parallel to the rotation shaft of the swingarm of the motorcycle's suspension, that is, parallel to the rotation axis of the rear wheel. Therefore, the motor weight distribution is necessarily uneven on the two sides of the vehicle, potentially affecting the stability of the same.

On another hand, the lateral connection to the various shafts through gearwheels, pulleys and transmissions requires significant space, which limits the space available for the batteries.

European patent EP2236338 describes a hybrid vehicle wherein the electric motor incorporated in the same is arranged such that its rotation shaft is transverse to the vehicle body in its direction of motion, with the above-described load problems.

European patent EP2168861 relates to an electric motorcycle wherein the motor is anchored to a swinging element. In this case the motor rotation shaft is also transverse to the vehicle body.

U.S. Pat. No. 5,433,284 refers to a electrical bicycle in which the motor is located beside the vehicle and its rotation shaft is connected to the shaft of the driven wheel in one of the ends of that shaft. Because of the motor is hung beside of the vehicle, the center of gravity is affected and the vehicle is unstable.

With regard to gearboxes there is an extensive body of patent documents, none of which appears to include the main elements of the gearbox of the present invention.

DESCRIPTION OF THE INVENTION

To solve the aforementioned drawbacks, the vehicle traction device that is the object of the present invention comprises:

A motor, preferably electric, located symmetrically between the side vertical tubes of a vehicle frame.

The term "vertical" used in relation to the tubes of a vehicle frame means that the tubes extend from a lower position of the vehicle to an upper position of the vehicle.

A primary shaft coplanar and concurrent with the rotation shaft of the motor, wherein the two said shafts engage one another in the center zone of an axial extension of the primary shaft, and wherein the primary shaft directly receives the force from the motor.

An output shaft that transmits the force from the motor to the drive wheel or wheels, through a gearwheel with a chain, belt pulley or cardan shaft.

The primary shaft is coaxial to the output shaft, wherein the output shaft axially crosses said primary shaft.

In a simple embodiment, the primary and output shafts rotate jointly permanently, and can be made from a single piece.

In the proposed invention, the rotation shaft of the motor and the primary shaft of the transmission are coplanar and concurrent. The angle between said two shafts can be different in different embodiments.

Thus, the position of the motor with respect to the primary shaft can vary in different embodiments. As stated, in a simple embodiment the traction system may not include a gear change element, as the performance of electric motors make this feasible.

An electric motor generates a torque close to its maximum value (almost 80%) from 750 RPM to 1,500 RPM and maximum torque from 1,500 RPM to 3,000 RPM, but beyond this point it starts to fall, up to the maximum revolutions regime.

Because of this behavior, it is considered possible to use a single gear; however, as the torque drops steeply at high revolutions, maximum speed is achieved with very little acceleration beyond 3,000 RPM and it is reached slowly.

This feature advises the use of at least one additional gear, such that from a standing start or at low speeds the first gear will provide good acceleration up to half of the maximum speed, and engaging the second gear makes use of the vehicle's inertia and the improved torque output to reduce the revolutions of the motor and achieve faster speeds.

For this purpose, the invention object described herein is provided with a gear shift comprising:

A primary shaft, understanding as such the shaft on which the motor rotation shaft acts directly through some engaging elements;

At least one secondary shaft permanently engaged to said primary shaft;

An output shaft coaxial with the primary shaft, wherein the output shaft coaxially crosses the primary shaft.

This arrangement of two coaxial shafts in which one shaft crosses the other prevents the longitudinal displacement of the shafts in the engaging and releasing operations of the same, resulting in reduced space requirements, particularly with regard to the length of the output shaft and therefore the total width of the transmission.

In vehicles with a swingarm, as is the case of two-wheel vehicles, both the primary and output shafts, which as mentioned before are coaxial, are also coaxial to the shaft of the swingarm of the suspension; this position can be adopted because of the reduced width of the transmission, thereby preventing transmission wear due to tension changes in the chain, for example.

As described above, the primary and secondary shafts are permanently engaged.

If the second gear (direct drive) is being used, the output shaft is engaged to the primary shaft, such that the secondary shaft turns freely without transmitting its motion to any other shaft.

If the first gear is being used, the secondary shaft is also engaged to the output shaft.

Changing gears will depend on whether the output shaft is engaged to the primary or the secondary shaft, and can be performed manually or automatically, with the assistance of electric devices such as servomotors, or by mechanical action.

The gearbox can include additional gears using parallel shafts with a different ratio to each other, which when appropriate engage the output shaft.

A traction system as described above allows placing the motor at a higher location and with an essentially vertical rotation shaft, whereby said rotation shaft acts on the primary shaft, which is coaxial to the swingarm shaft and the output shaft. In this way there is sufficient space left in the front of the motor to house the vehicle batteries.

In most of the various possible positions of the motor, one of the sides of said motor is facing the direction of motion, such that the efficacy of the ventilation fins, which are typically arranged longitudinally to the rotation shaft of the motor, is limited.

To optimize the cooling action of the air when the motor is operating, the invention comprises a number of cooling fins transverse to the rotation shaft of the motor, thereby enhancing the passage of air between them when the vehicle is in motion.

DESCRIPTION OF AN EMBODIMENT OF THE INVENTION

Figure 1:
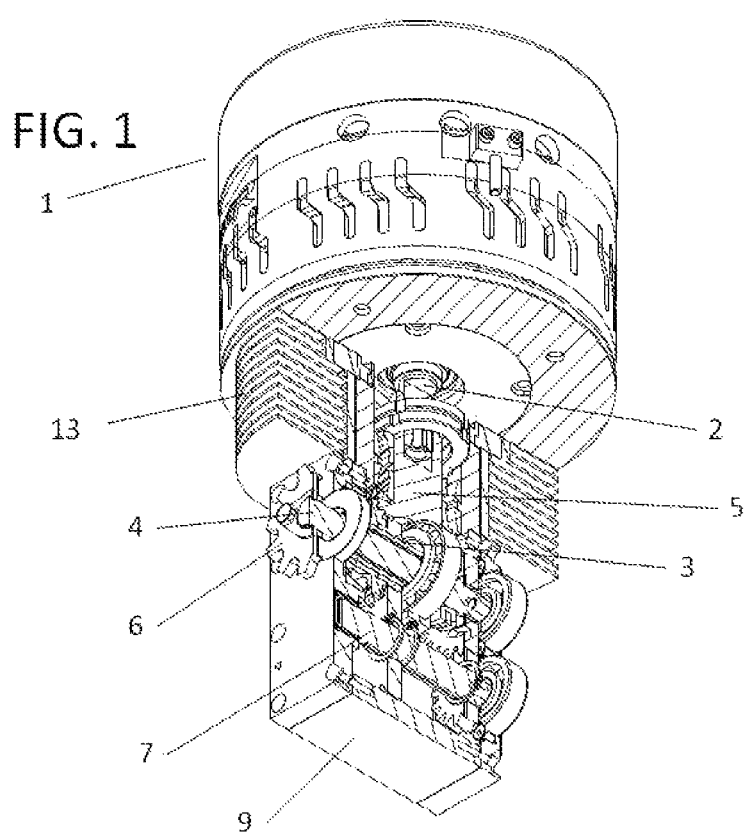
FIG. 1 shows a perspective view of the traction system, which comprises a motor (1) and a transmission (9), wherein the rotation shaft (2) of the motor engages through engaging means (5) to the central zone of an axial extension of a primary shaft (3) which is coaxial to an output shaft (4), which transmits the force from the motor to the drive wheel or wheels through a pinion gear (6). It also shows a secondary shaft (7) permanently engaged to the primary shaft, as well as the cooling fins (13) transverse to the motor rotation shaft.
Figure 2:
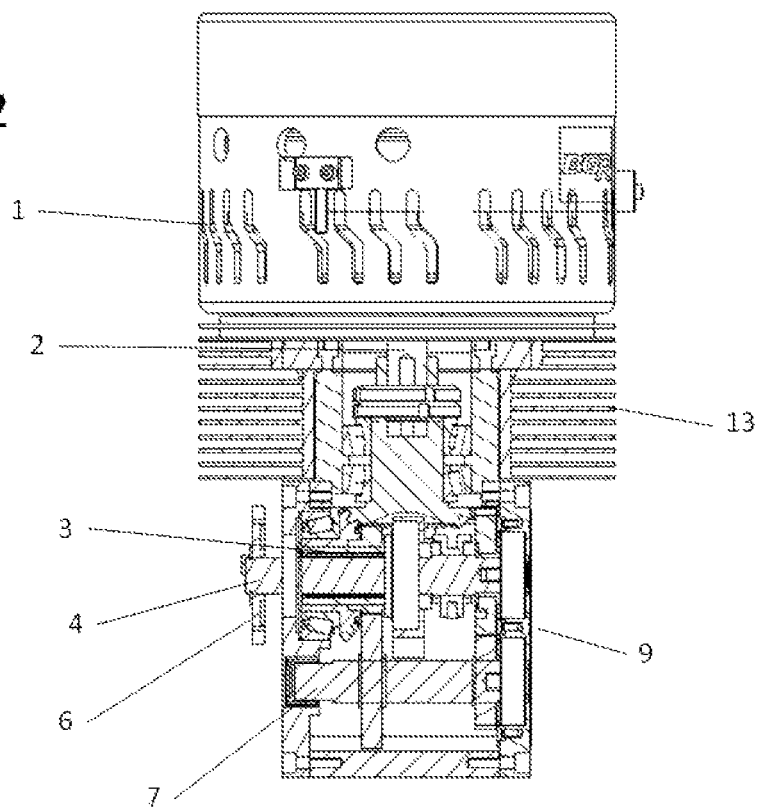
FIG. 2 shows an elevation cross-section of the traction system, which comprises a motor (1) and a transmission (9), wherein the rotation shaft (2) of the motor engages through engaging means (5) to the central zone of an axial extension of a primary shaft (3) that is coaxial to an output shaft (4) which transmits the force of the motor to the drive wheel or wheels through a pinion gear (6). It also shows a secondary shaft (7) permanently engaged to the primary shaft.
Figure 3:
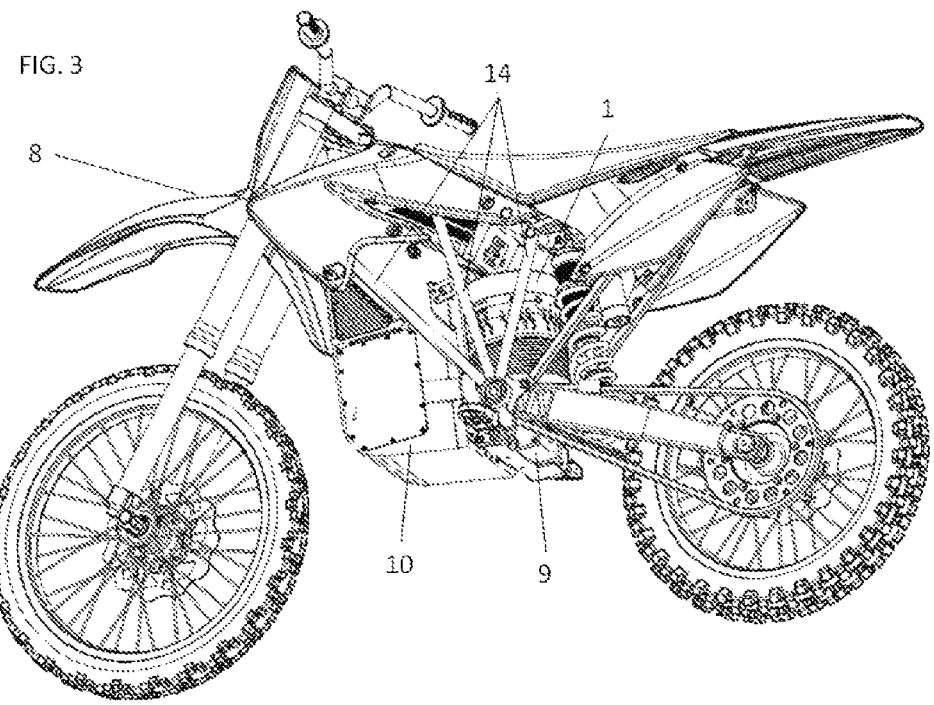
FIG. 3 shows the traction device installed in a two-wheel vehicle (8), enabling to see that the device allows an arrangement such that the motor (1) is housed above the transmission (9), leaving ample space for placing the batteries (10). The side vertical tubes (14) of the frame are also shown
Figure 4:
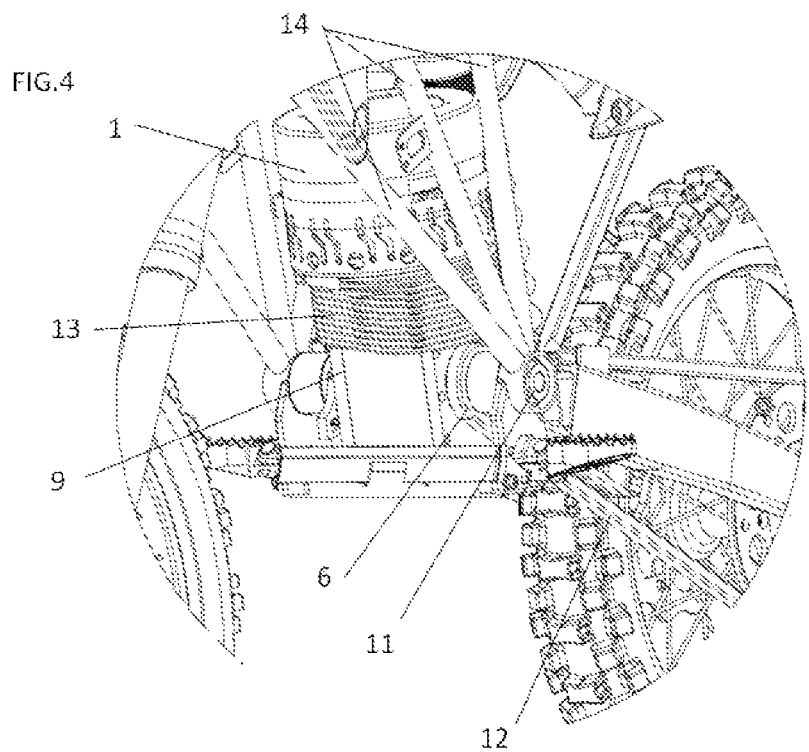
FIG. 4 shows an enlarged view of the device installed in a two-wheel vehicle where the batteries have been removed, revealing the motor (1) located symmetrically between the side tubes of the vehicle frame, with the cooling fins (13), the transmission (9) and the swingarm (11), which is coaxial to the primary shaft and the output shaft, not shown, showing the chain (12) that transmits the force from the pinion gear (6) of the output shaft, shown covered, to the drive wheel. The side vertical tubes (14) of the frame are also shown

An embodiment of the invention is described below for purposes of illustration only and in a non-limiting sense.

The vehicle traction device according to the embodiment proposed herein comprises:

1. An electric motor (1) symmetrically located between the vertical tubes of the frame of the vehicle, A transmission element (9) comprising a two-speed gearbox, which in turn comprises:

A primary shaft (3) that is coplanar and concurrent with the rotation shaft (2) of the motor, wherein the motor (1) is arranged above the transmission element (9);

An output shaft (4) coaxial to the aforementioned primary shaft (3), wherein the primary shaft (3) partially surrounds the output shaft (4);

Both the primary (3) and output (4) shafts are in turn coaxial to the shaft of the swingarm (11) of the vehicle (11), which in this case is a two-wheel vehicle;

Engaging elements to link, when applicable, the motion of the primary shaft to the output shaft;

A secondary shaft (7) permanently engaged to the primary shaft (3);

Elements for engaging, when applicable, the secondary shaft (7) to the output shaft (4);

Elements, in this case a chain (12), for transmitting the movement of the output shaft (4), which incorporates a pinion gear (6), to the drive wheel, in this case the rear wheel.

As stated above, the motor (1) is placed above the transmission element (9), freeing sufficient space in front to place the batteries.

Making the output shaft (4) coaxial to the shaft of the swingarm (11) reduces load son the transmission elements, such as the chain (12), as the distance between the output shaft (4) and the axle of the drive wheel remains constant.

With regard to gears, the gearbox operates as follows:

In second gear, the primary shaft (3) and the output shaft (4) are engaged and turn together, while the secondary shaft (7) is engaged permanently to the primary shaft (3) and also turns but does not transmit its motion to any other shaft.

In first gear the secondary shaft (7) engages the output shaft (4) which, before engaging the secondary shaft (7), is disengaged from the primary shaft (3).

The differences in rotation speed between the shafts are achieved by a cascade of pinion gears and gearwheels.

The shafts can be engaged and disengaged either automatically or manually; if it is done manually, it can be assisted by servomotor or by a mechanical shift.

Figure 5:
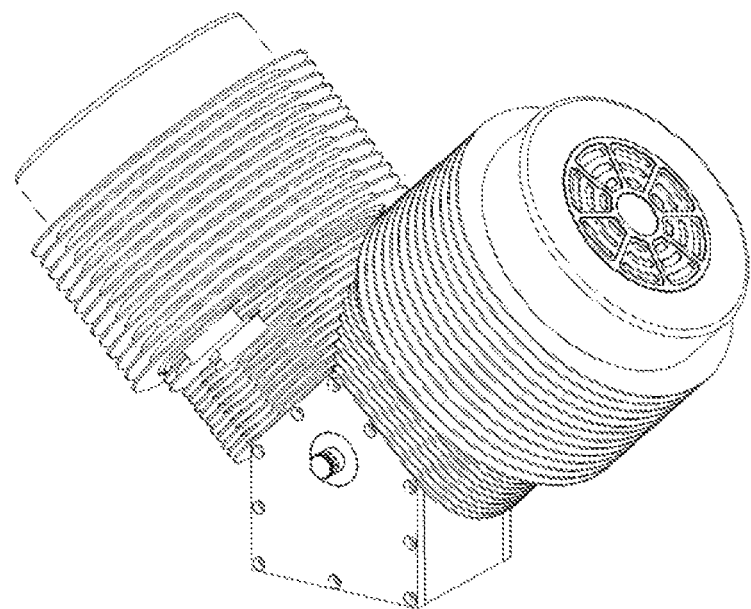
FIG. 5 shows an example of an embodiment of the device
Figure 6:
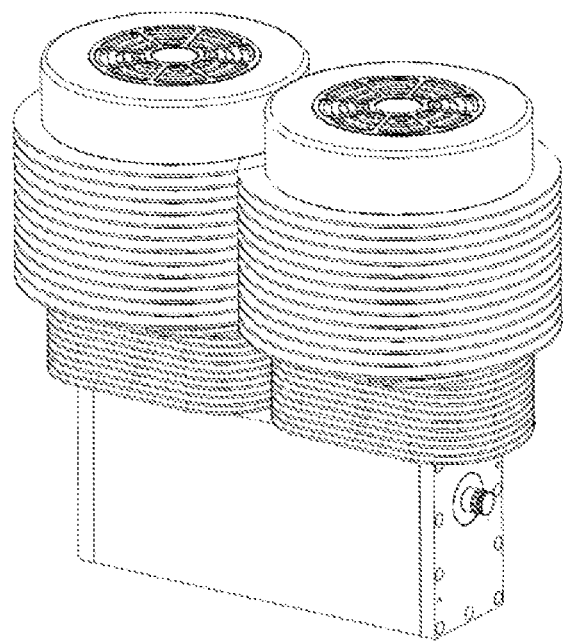
FIG. 6 shows an example of an embodiment of the device
Figure 7:
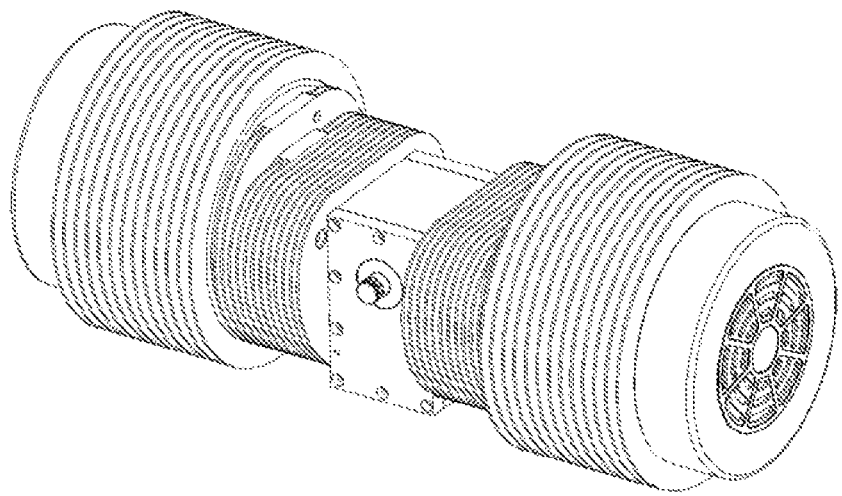
FIG. 7 shows an example of an embodiment of the device In FIGS. 5, 6 and 7 the cooling fins cover both the transmission and the motor itself.

There are numerous other possible embodiments in addition to the one described. An example of one with regard to the arrangement of the motor is shown in FIGS. 5 to 7, and there are also many options regarding the type of vehicle incorporating it.

To assist the cooling of the motor and the transmission, cooling fins (13) have been incorporated arranged transversally to the rotation shaft of the motor, such that the air passes easily through them aided by the motion of the vehicle.

The invention claimed is:

1. A vehicle traction device characterized in that it comprises:
   at least one motor located symmetrically between side vertical tubes of a vehicle frame;
   a transmission element comprising:
   a. a primary shaft coplanar and concurrent to a motor rotation shaft;
   b. engaging elements between the primary shaft and the motor rotation shaft wherein the two said shafts engage one another in a center zone of an axial extension of the primary shaft,
   c. an output shaft coaxial to the primary shaft;
   d. means for temporarily or permanently linking the rotation of the primary shaft and the output shaft;
   e. means for transmitting the rotation of the output shaft to the drive element of the vehicle.

2. The vehicle traction device to claim 1 characterized in that:
   the output shaft is independent of the primary shaft, wherein the output shaft crosses the primary shaft and extends beyond the ends thereof; and in that the vehicle traction device further comprises:
   at least one secondary shaft engaged to the primary shaft;
   means for engaging the primary shaft and the output shaft;
   means for engaging the secondary shaft and the output shaft.

3. The vehicle traction device according to claim 1 or 2, characterized in that it further comprises a swingarm shaft which is coaxial to the primary shaft and the output shaft.

4. The vehicle traction device according to claim 1 or 2, characterized in that the motor occupies a position above the transmission element.

5. The vehicle traction device according to claim 1 or 2, characterized in that the motor is electric.

6. The vehicle traction device according to claim 1 or 2, characterized in that it comprises a series of cooling fins arranged transversally to the rotation shaft of the motor.

7. A vehicle incorporating the traction device described in claim 1.

* * * * *